(12) United States Patent
Shibuya et al.

(10) Patent No.: US 6,235,356 B1
(45) Date of Patent: *May 22, 2001

(54) RESIN COMPOSITION FOR BUILDING MATERIALS AND INSULATING GLASS

(75) Inventors: Takashi Shibuya; Seigo Kotera; Hideki Nakagawa; Yoshitaka Matsuyama, all of Yokohama (JP)

(73) Assignee: Asahi Glass Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,564
(22) PCT Filed: Dec. 25, 1996
(86) PCT No.: PCT/JP96/03787
  § 371 Date: Oct. 16, 1997
  § 102(e) Date: Oct. 16, 1997
(87) PCT Pub. No.: WO97/23561
  PCT Pub. Date: Jul. 3, 1997

(30) Foreign Application Priority Data

Dec. 26, 1995 (JP) .................................................. 7-339629
Aug. 14, 1996 (JP) .................................................. 8-214865

(51) Int. Cl.$^7$ ............................... E06B 3/24; C03C 27/00
(52) U.S. Cl. .............................. 428/34; 156/109; 52/172; 52/204.5; 52/786.13
(58) Field of Search .......................... 428/34, 440, 441; 525/240, 232; 52/786.13, 172, 204.5; 156/107, 109

(56) References Cited

U.S. PATENT DOCUMENTS

| | | | |
|---|---|---|---|
| 3,791,910 | * | 2/1974 | Bowser .................................. 161/45 |
| 3,822,172 | * | 7/1974 | Rullier .................................. 161/45 |
| 3,832,254 | * | 8/1974 | Bowser et al. ...................... 156/107 |
| 3,852,149 | | 12/1974 | Sitter et al. . |

(List continued on next page.)

FOREIGN PATENT DOCUMENTS

| | | | |
|---|---|---|---|
| 217159 | * | 10/1956 | (AU) . |
| 0 503 220 | | 9/1992 | (EP) . |
| 0 719 904 | | 7/1996 | (EP) . |
| 989845 | * | 4/1965 | (GB) . |
| 61-20501 | | 5/1986 | (JP) . |
| 7-17748 | | 1/1995 | (JP) . |

OTHER PUBLICATIONS

Patent Abstracts of Japan, vol. 095, No. 004, May 31, 1995, JP 07 017748, Jan. 20, 1995.

*Primary Examiner*—Donald J. Loney
(74) *Attorney, Agent, or Firm*—Oblon, Spivak, McClelland, Maier & Neustadt, P.C.

(57) ABSTRACT

An insulating glass includes two or more glass sheets forming an air space layer between them. The glass sheets are separated by a spacer made of a resin having a JIS A hardness of from 10 to 90 at 25° C. The resin is a thermoplastic composition including a butyl rubber and a crystalline polyolefin. The resin contains from 50 to 98 wt % butyl rubber, from 2 to 50 wt % crystalline polyolefin, and from 10 to 200 wt % inorganic fillers, based on the total amount of butyl rubber and crystalline polyolefin in the resin.

12 Claims, 3 Drawing Sheets

U.S. PATENT DOCUMENTS

| | | | |
|---|---|---|---|
| 4,042,736 | * | 8/1977 | Flint ........................................ 428/34 |
| 4,109,431 | * | 8/1978 | Mazzoni et al. ........................ 52/172 |
| 4,130,534 | * | 12/1978 | Coran et al. ......................... 260/33.6 |
| 4,171,601 | * | 10/1979 | Gotz ........................................ 52/790 |
| 4,198,254 | * | 4/1980 | Laroche et al. ....................... 156/107 |
| 4,215,164 | * | 7/1980 | Bowser .................................. 428/34 |
| 4,552,790 | * | 11/1985 | Francis .................................... 428/34 |
| 4,622,249 | * | 11/1986 | Bowser .................................. 428/34 |
| 4,728,692 | * | 3/1988 | Sezaki et al. .......................... 525/74 |
| 4,822,649 | * | 4/1989 | Canaud et al. ......................... 428/34 |
| 5,021,500 | * | 6/1991 | Puydak et al. ....................... 524/525 |
| 5,270,091 | * | 12/1993 | Krysiak et al. ........................ 428/68 |

\* cited by examiner

RESIN COMPOSITION FOR BUILDING MATERIALS AND INSULATING GLASS

TECHNICAL FIELD

The present invention relates to a resin composition for building material, particularly a resin composition for a spacer for an insulating glass, and an insulating glass employing a spacer made of a resin.

BACKGROUND ART

In recent years, insulating glasses have attracted attention from the viewpoint of energy saving, and they are commercial products, the demand of which continues to increase. For their production, many steps are required. Accordingly, their costs are high as compared with usual glass sheets, and it is desired to further lower the costs.

Most of insulating glasses presently available have a structure as shown in FIG. 4, wherein at least two glass sheets 1a and 1b are arranged to face one another via a spacer 2 to form an air space layer between the glass sheets 1a and 1b. And, a primary sealing material 3 is interposed between the spacer 2 and the glass sheets 1a and 1b to insulate the air space layer from the external air, and a cavity (recess) defined by the peripheral surface of the spacer and the inside surfaces of the peripheral portions of the glass sheets facing to one another, is sealed by a cold-setting secondary sealing material represented by a polysulfide type or a silicone type sealing material.

Heretofore, various improvements in productivity by simplification or automation and attempts for cost down have been studied and proposed for the process for producing insulating glasses. For example, a system for folding an aluminum spacer, or automation of the method of injection the cold-setting sealing material, may be mentioned. Further, as shown in FIG. 5, a method of employing a resin having a drying agent kneaded therein, as a spacer 4 instead of an aluminum spacer, has been proposed.

However, an insulating glass employing such a cold-setting sealing material requires curing for a long period of time for setting of the sealing material after preparation of the insulating glass, irrespective of the type of the spacer used. Accordingly, the product can not be shipped until completion of the curing.

Thus, it is necessary to provide a space for curing in the plant and to ship the product after storing it for a predetermined period of time, whereby the time period of delivery tends to be long, and it has been difficult to meet the demand of customers. Further, in order to comply with the demand which appears to increase in future, a wider space for curing will be required, and to secure adequate supply of insulating glasses while avoiding such a wider space, it is considered necessary to shorten the curing time.

From the viewpoint of lowering the costs for insulating glasses, a method has been proposed in which a molded product made of a resin having a drying agent kneaded therein is used as a spacer, and an insulating glass is prepared without using a secondary sealing material (JP-B-61-20501). However, this resin for spacer is inadequate in hardness as a spacer, and with the spacer made of the above resin alone, it has been practically difficult to maintain the shape of an insulating glass.

Further, an insulating glass is known in which a material having a drying agent kneaded into an extrusion moldable hard resin, for example, a thermoplastic resin such as a vinyl chloride resin or a hot-melt butyl and having a JIS A hardness (EsA) of 95, is used as a spacer (JP-A-7-17748). However, if this material having a hardness of HsA95 is used as a spacer or a sealing material for an insulating glass, the stress which will be exerted to the glass sheets or the sealing portion of the insulating glass will be so large that there will be difficulties such that the sealing portion undergoes peeling or the glass sheets of the insulating glass undergo breakage. Accordingly, at present, no insulating glass is known which fully satisfies the properties such as useful life, dimensional stability and moldability required for an insulating glass solely by a spacer without using a secondary sealing material.

Meanwhile, as illustrated by a hot-melt butyl in the above-mentioned publications, a butyl type rubber is used as a sealing agent for building material by virtue of its adhesive property, high weather resistance and low moisture permeability. However, the hardness is low, and it has a cold flow property. Accordingly, depending upon the particular purpose of use, it has a problem from the viewpoint of durability for a long period of time, if used alone. Further, it also has a problem that the melt viscosity is high, and the operation efficiency is poor. To improve the hardness, it has been proposed to mix various fillers, but if it is attempted to improve the hardness only by adding a filler, the melt viscosity tends to increase, whereby the operation efficiency will be impaired, and in some cases, the tensile strength or the tear strength tends to be low, such being undesirable.

Namely, the butyl type rubber has a function to seal the interface between the spacer and the glass sheets and to maintain the air tightness, and thus it is suitable for use as an end sealing material for an insulating glass. In such a case, as the hardness of the butyl type rubber is low, it is common to use a spacer made of a metal such as aluminum, and the butyl type rubber is disposed as a sealing material between the spacer and the glass sheets. Thus, the process for producing an insulating glass will be complicated, since it is required to use a spacer made of a metal as described above.

Accordingly, it is desired to develop a sealing agent which does not require a spacer made of a metal and which is capable of simplifying the production process. At present, no insulating glass has been known which fully satisfies the properties such as useful life, dimensional stability and moldability required for an insulating glass solely by a spacer without using a secondary seal.

An object of the present invention is to provide a resin composition which satisfies properties required for use as building material, particularly a resin composition for a spacer which does not substantially require the above-mentioned secondary sealing material in an insulating glass. Further, another object of the present invention is to solve the problem of curing which requires a long period of time after the preparation and to provide an insulating glass which is capable of realizing high productivity which has not been attained heretofore.

DISCLOSURE OF THE INVENTION

The present invention provides a resin composition for building material, which comprises a butyl type rubber and a crystalline polyolefin, wherein the proportion of the butyl type rubber is from 50 to 98 wt %, and the proportion of the crystalline polyolefin is from 2 to 50 wt %, based on the total amount of the two.

Further, the present invention provides a resin composition for building material, which comprises a butyl type rubber, a crystalline polyolefin and an inorganic filler, wherein the proportion of the butyl type rubber is from 50 to 98 wt %, and the proportion of the crystalline polyolefin is from 2 to 50 wt %, based on the total amount of the butyl type rubber and the crystalline polyolefin, and the proportion of the inorganic filler is at most 200 parts by weight per 100 parts by weight of the sum of the butyl type rubber and the crystalline polyolefin.

Still further, the present invention provides an insulating glass comprising two or more glass sheets which are arranged to face one another as spaced by a spacer to form an air space layer therebetween, wherein said spacer is made of a thermoplastic resin composition having a JIS A hardness of from 10 to 90 at 25° C.

BEST MODE FOR CARRYING OUT THE INVENTION

Now, the present invention will be described in further detail with reference to the drawings.

Figure 1:
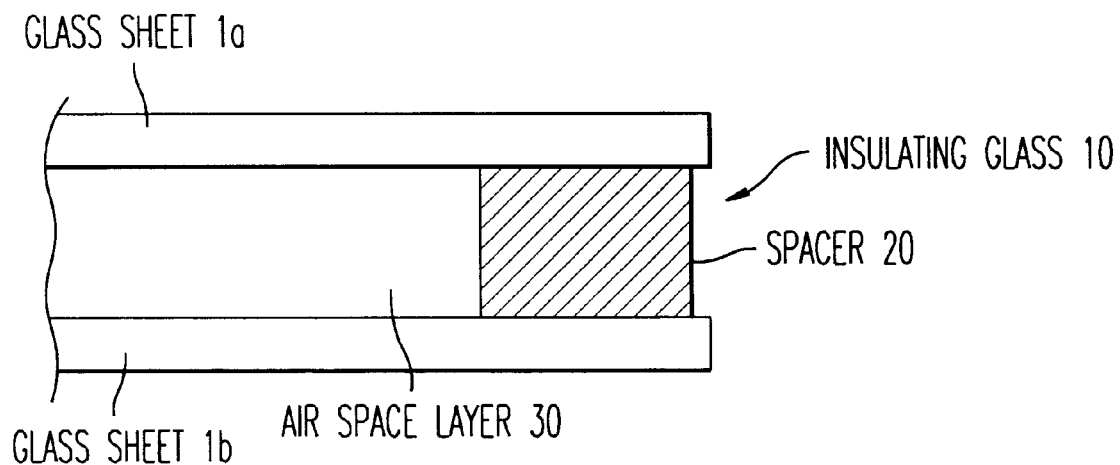
FIG. 1 is a schematic partial cross-sectional view showing an example of the structure of an insulating glass of the present invention.

FIG. 1 is a schematic partial cross-sectional view showing an example of the structure of an insulating glass of the present invention, wherein the insulating glass 10 comprises two glass sheets 1a and 1b which are held in a predetermined distance solely by a spacer 20 so as to form an air space layer 30 inbetween. The spacer 20 is made of a thermoplastic resin composition having a JIS A hardness of from 10 to 90. Here, the above "solely by a spacer 20" means that no other secondary sealing material or metal spacer is required, and primer treatment which may be applied as the case requires, is included.

The thermoplastic resin composition used as a spacer material in the construction of the insulating glass of the present invention is a thermoplastic resin composition having a JIS A hardness of from 10 to 90 at 25° C. As such a resin composition for spacer, any thermoplastic resin composition may be used so long as it has the above-mentioned properties.

Further, a thermoplastic elastomer which is used in various fields in recent years, or a rubber material having the vulcanization density adjusted to make it melt-flowable by heating, is also included in the "thermoplastic resin composition" for the purpose of the present invention, so long as it has the above-mentioned properties. Further, a blend product having a so-called plasticizer such as dibutyl phthalate or di-2-ethylhexyl phthalate incorporated to such a thermoplastic resin composition, is also included in the "thermoplastic resin composition" for the purpose of the present invention, so long as it has the above-mentioned properties.

Specifically, the above resin composition to be used in the present invention preferably contains at least one of a low moisture permeable hot-melt moldable rubber or elastomer and a low moisture permeable thermoplastic resin other than such rubber or elastomer. More preferably it contains both of them. Further, in order to prevent penetration of moisture into the air space layer of an insulating glass when such an insulating glass is constructed, the resin composition preferably has a predetermined amount of a drying agent kneaded therein.

The above low moisture permeable hot-melt moldable rubber or elastomer is preferably a rubber or elastomer having a moisture permeation constant of at most $3000 \times 10^{-13}$ cm$^3$·cm/cm$^2$·sec·Pa. Particularly preferred among them is a butyl type rubber such as halogenated butyl rubber or butyl rubber composed mainly of polyisobutylene, or isobutylene and isoprene. Such thermoplastic resins and low moisture permeable hot-melt moldable rubbers or elastomers may be used alone or in combination as a blend of two or more of them.

The low moisture permeable thermoplastic resin other than said rubber or elastomer may, for example, be polyethylene, polypropylene, vinylidene chloride or polyvinyl chloride, or a copolymer of monomers constituting such polymers, or a modified product thereof. Particularly preferred is high density polyethylene. The moisture permeation constant of these thermoplastic resins is preferably at most $3000 \times 10^{-13}$ cm$^3$·cm/cm$^2$·sec·Pa, more preferably at most $500 \times 10^{-13}$ cm$^3$·cm/cm$^2$·sec·Pa. Such a thermoplastic resin contributes to the dimensional stability of the spacer.

To the resin composition for spacer in the present invention, in addition to the above-mentioned low moisture permeable hot-melt moldable rubber or elastomer and the thermoplastic resin other than such rubber or elastomer, a drying agent may be incorporated, and further an inorganic filler or other additives may be incorporated as the case requires. As the drying agent, any drying agent which is commonly used as mixed to a sealing material or a spacer for a conventional insulating glass, such as zeolite, alumina or silica gel, may be used.

Such a resin composition for spacer comprises the above-mentioned components as desired components. However, additives such as a tackifier, a lubricant, a pigment, an antistatic agent, an antioxidant, a heat stabilizer, a filler and a blowing agent, may be incorporated to the above thermoplastic resin, as the case requires.

Such a resin composition for spacer is prepared by kneading the above-described components. In its preparation, the necessary components will be blended so that the JIS A hardness of the resulting resin composition will be at most 90 at 25° C. The reason for limiting the hardness to at most 90 is as follows.

If it is attempted to use a thermoplastic resin having a JIS A hardness exceeding 90 as a spacer for an insulating glass, no substantial creep takes place, and thus when a durability test specified in JIS R3209 is carried out thereon, the stress due to expansion of air at a high temperature will be exerted to the bonding interface between the glass sheets and the spacer. Therefore, if the bonding force is inadequate, peeling will result, and even if an adequate bonding force is secured, the glass is likely to break. Even with an adhesive currently available, it is possible to obtain a bonding force high enough to be durable against a stress due to expansion of the air space layer due to a high temperature or a high pressure. However, breakage of the glass is likely to occur under such a high pressure at a high temperature, whereby the productivity decreases substantially, and such is not suitable for the purpose of the present invention intended to reduce the production costs.

On the other hand, if the hardness is too low, there will be a problem in the dimensional stability of the insulating glass. Accordingly, it is necessary to blend the necessary components so that the JIS A hardness of the resin composition will be at least 10 at 25° C. Further, even if the JIS A hardness is at least 10, if the hardness is relatively small, sheet-shifting is likely to result when the air space layer is thick.

In an insulating glass which is commonly used, the thickness of the air space layer is from about 4 to 18 mm (6 mm or 12 mm in many cases). Accordingly, in a case where the hardness is relatively low, even if no sheet-shifting takes place with one having an air space layer thickness of 6 mm, sheet-shifting may sometimes takes place with one having an air space layer thickness of 12 mm. By making the hardness to a level of at least 40, it is possible to avoid sheet-shifting even with one having an air space layer thickness of 12 mm. Therefore, in the insulating glass of the present invention, the JIS A hardness of the thermoplastic resin spacer is particularly preferably at least 40.

In an insulating glass wherein a resin composition having a JIS A hardness exceeding 90 is used as a spacer, the stress exerted to glass sheets will be large. Therefore, even with an insulating glass employing either one of glass sheets having thicknesses of 5 mm and 3 mm, as stipulated in JIS R3209, glass breakage will result during an accelerated durability test.

Whereas, in the case of an insulating glass wherein a resin composition having a JIS A hardness of 90 is used as a spacer, no glass breakage will occur in the above test with an insulating glass wherein glass sheets having a thickness of 5 mm are used. On the other hand, with an insulating glass wherein glass sheets having a thickness of 3 mm are used, there has been a possibility that glass breakage occurs in the above test. Accordingly, the upper limit of the JIS A hardness of the resin composition for spacer is 90. Further, with an insulating glass wherein a resin composition having a JIS A hardness of 75 is used as a spacer, no glass breakage will occur in the above test in either case of insulating glasses employing glass sheets having thicknesses of 5 mm and 3 mm. Glass sheets for insulating glasses commonly used at present have a thickness of 3 mm, and the JIS A hardness of the resin composition for spacer is accordingly preferably within a range of from 40 to 75.

While the JIS A hardness dictates a stress exerted instantaneously, the creep compliance J as an index for creep characteristics, indicates a resin property in a case where a continuous stress is exerted, and it is represented by a reciprocal number of the modulus of elasticity. This creep compliance J is measured, for example, as follows.

Figure 6:
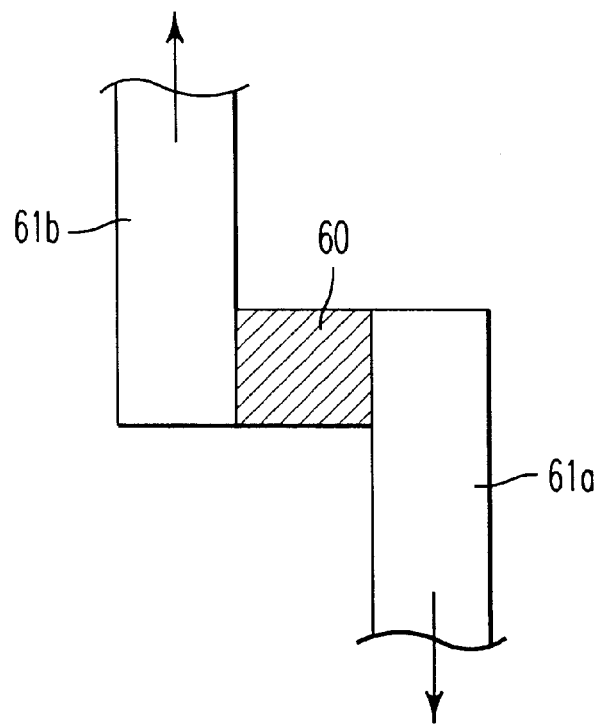
FIG. 6 is a schematic cross-sectional view illustrating an example of the method for measuring creep compliance J.

FIG. 6 is a schematic cross-sectional view showing a method for measuring the creep compliance J. A resin material 60 to be measured, is shaped to have a thickness of 12 mm and a size of the surface area bonded to each glass sheet 61a or 61b being 10×50 (mm). And, the glass sheets are pulled in the directions shown by arrows in the Figure at an ambient temperature of 40° C. so that a stress of 0.2 kg/cm$^2$ is always exerted to the resin material, whereby the creep compliance J is calculated from the elongation of the material after 5 minutes. The value of J does not depend on the thickness of the glass sheets 61a and 61b, but here, glass sheets having a thickness of 5 mm are used.

For example, when an insulating glass is put on a pallet, for the transportation after its preparation, a glass sheet on one side of the insulating glass will be adsorbed by suction cups. It is likewise adsorbed also when the insulating glass is taken out from the pallet. Such a so-called "cantilever" state of the insulating glass by suction cups will usually be at most 5 minutes. Further, the outdoor temperature in the summer time is likely to rise to about 40° C. Therefore, in order to prevent sheet-shifting during the operation, the creep compliance J is preferably at most $1 \times 10^{-5}$ (cm$^2$/dyne) as measured after 5 minutes from initiation of the measurement in a shear deformation mode at 40° C. Further, if the creep compliance J is less than $1 \times 10^{-10}$ (cm$^2$/dyne) as measured after 5 minutes from initiation of the measurement in a shear deformation mode at 40° C. there will be no substantial creep, whereby the stress exerted between the glass sheets and the spacer increases to bring about a problem such as peeling or glass breakage. Accordingly, J is preferably at least $1 \times 10^{-10}$ (cm$^2$/dyne) as measured after 5 minutes from initiation of the measurement in a shear deformation mode at 40° C.

As mentioned above, the thickness of the air space layer in an insulating glass is from about 4 to 18 mm in many cases. Therefore, even if the creep compliance J is less than $1 \times 10^{-5}$ (cm$^2$/dyne) as measured after 5 minutes from initiation of the measurement in a shear deformation mode at 40° C., if the creep compliance J is relatively large, sheet-shifting may sometimes occur when the air space layer is thick. For example, when the creep compliance J is large, even if no sheet-shifting occurs with one having an air space layer thickness of 6 mm, sheet-shifting may sometimes occur with one having an air space layer thickness of 12 mm. Therefore, by adjusting the creep compliance to a level of at most $1 \times 10^{-6}$ (cm$^2$/dyne), it is possible to avoid sheet-shifting even with one having an air space layer thickness of 12 mm.

Further, it is particularly preferred that the lower limit of the creep compliance J is $1 \times 10^{-9}$ (cm$^2$/dyne). Namely, at a value of $1 \times 10^{-10}$ (cm$^2$/dyne), for example, in a durability test stipulated in JIS R3209, even if glass sheets do not break with an insulating glass employing glass sheets having a thickness of 5 mm, glass sheets may sometimes break with an insulating glass employing glass sheets having a thickness of 3 mm. Therefore, to avoid breakage of glass sheets with glass sheets of various thicknesses, it is particularly preferred that the lower limit of the creep compliance J is $1 \times 10^{-9}$ (cm$^2$/dyne) as measured after 5 minutes from initiation of the measurement in a shear deformation mode at 40° C.

In summary, as the resin composition to be used as a spacer in the present invention, it is particularly preferred to employ one having a JIS A hardness of from 40 to 75 and a creep compliance J within a range of from $1 \times 10^{-6}$ to $1 \times 10^{-9}$ (cm$^2$/dyne) as measured after 5 minutes from initiation of the measurement in a shear deformation mode at 40° C.

Further, it is preferred that as the entire resin composition, the moisture permeation constant is at most $5000 \times 10^{-13}$ cm$^3$·cm/cm$^2$·sec·Pa, and further, in order to maintain the dew point property, the moisture permeation constant is preferably at most $500 \times 10^{-13}$ cm$^3$·cm/cm$^2$·sec·Pa.

Specific examples of the resin composition for spacer having the foregoing JIS A hardness, creep compliance J and moisture permeation constant, will be described in Examples which will be given hereinafter. However, blend components of preferred resin compositions and their blend proportions are as follows.

| | |
|---|---|
| Hot-melt moldable rubber or elastomer | 10 to 80 wt % |
| Thermoplastic resin other than said ruber or elastomer | 0 to 50 wt % |
| Tackifier | 0 to 15 wt % |
| Drying agent and additives (carbon black, talc, etc.) | 10 to 60 wt % |

Here, the additives include, for example, a lubricant, a pigment, an antistatic agent, a plasticizer, an aging-preventive agent, a heat stabilizer, an antioxidant, a hydrolyzable silyl group-containing compound such as a silane coupling agent, a blowing agent and a filler containing an inorganic filler. The term "additives" used elsewhere means those having an inorganic filler extruded from the above additives and having a tackifier included thereto.

As other preferred resin compositions for spacer, the following compositions may be mentioned wherein a butyl type rubber is used as the hot-melt moldable rubber or elastomer, and a crystalline polyolefin is used as the thermoplastic resin other than said rubber and elastomer.

A resin composition comprising a butyl type rubber and a crystalline polyolefin, wherein the proportion of the butyl type rubber is from 50 to 98 wt %, and the proportion of the crystalline polyolefin is from 2 to 50 wt %, based on the total amount of the two.

A resin composition comprising a butyl type rubber, a crystalline polyolefin and an inorganic filler, wherein the proportion of the butyl type rubber is from 50 to 98 wt %, and the proportion of the crystalline polyolefin is from 2 to 50 wt %, based on the total amount of the butyl type rubber and the crystalline polyolefin, and the proportion of the inorganic filler is at most 200 parts by weight per 100 parts by weight of the sum of the butyl type rubber and the crystalline polyolefin.

In the present invention, butyl rubber rubber may, for example, be a homopolymer of isobutylene, a copolymer thereof with other monomer, or a modified product thereof. Preferred as the copolymer, is a copolymer obtainable by copolymerization with a relatively small amount of isoprene (one usually called butyl rubber). The modified product may, for example, be halogenated butyl rubber or partially cross-linked butyl rubber. Particularly preferred butyl rubbers are a copolymer of isobutylene with isoprene, which is usually called butyl rubber, and partially cross-linked butyl rubber.

In the present invention, the crystalline polyolefin may, for example, be a homopolymer of an olefin such as ethylene or propylene, a copolymer thereof with other monomer, or a modified product thereof, which has crystallizability. The structure of the polymer is preferably a syndiotactic structure or an isotactic structure, but it may contain other structures. The olefin is particularly preferably ethylene or propylene.

The copolymer may, for example, be a copolymer of two or more olefins, or a copolymer of an olefin with other monomers, and preferred is a copolymer of ethylene or propylene with other monomer which does not hinder the crystallizability. As the copolymer, a block copolymer is preferred to an alternating copolymer or a random copolymer. The modified product may, for example, be a crystalline polyolefin having functional groups such as acid anhydride groups, carboxyl groups or epoxy groups introduced.

A particularly preferred crystalline polyolefin in the present invention is polyethylene or polypropylene-as a substantial homopolymer. For example, as the polyethylene, low density polyethylene, intermediate density polyethylene or high density polyethylene may be used. The crystallinity of the crystalline polyolefin is preferably at least 30%, more preferably at least 50%. For example, with respect to usual crystalline polyolefins, typical values of crystallinity are from 50 to 60% with low density polyethylene, from 75 to 90% with high density polyethylene, and from 55 to 65% with polypropylene. The molecular weight is not particularly limited, but the number average molecular weight is from about 200,000 to 800,000 with polyethylene, and from about 100,000 to 400,000 with polypropylene.

As described above, polyethylene or polypropylene has high crystallizability and thus is less moisture permeable than the butyl type rubber. With one having a lower melt viscosity among them, the melt viscosity of the composition decreases and the moldability improves as compared with a case where the butyl type rubber is used alone. Accordingly, various inorganic fillers may be blended, whereby a resin material for spacer having high hardness can be realized, and such is particularly preferred also from the viewpoint of the economical efficiency.

In the above resin composition, the proportion of the crystalline polyolefin in the total amount of the butyl type rubber and the crystalline polyolefin is from 2 to 50 wt %, preferably from 5 to 40 wt %. If the proportion of the crystalline polyolefin is less than 2 wt %, it tends to be difficult to attain the high hardness of the butyl type rubber, and if it exceeds 50 wt %, the nature of the crystalline polyolefin tends to be predominant, whereby the characteristics of the butyl type rubber tend to be hardly obtainable.

When an inorganic filler is incorporated, the proportion of the crystalline polyolefin in the total amount of the butyl type rubber and the crystalline polyolefin may be small. For example, when an inorganic filler is incorporated in an amount of at least about 50 parts by weight per 100 parts by weight of the sum of the butyl type rubber and the crystalline polyolefin, the proportion of the crystalline polyolefin in the total amount of the butyl type rubber and the crystalline polyolefin may be from 2 to 20 wt %, whereby adequate intended effects can be obtained.

Thus, a substantially effective amount of an inorganic filler can be incorporated to the resin composition of the present invention comprising the butyl type rubber and the crystalline polyolefin. The substantially effective amount means at least 1 part by weight per 100 parts by weight of the sum of the butyl type rubber and the crystalline polyolefin. If the inorganic filler is incorporated too much, the melt viscosity of the composition will increase, or the tensile strength or the tear strength will decrease. Therefore, the upper limit of the amount of its incorporation is 200 parts by weight, preferably 150 parts by weight. In the case where an inorganic filler is incorporated, a preferred lower limit of the amount of its incorporation is 10 parts by weight.

As the inorganic filler, those commonly used as inorganic fillers, such as calcium carbonate, talc, mica, and carbon black, may be used alone or in combination as a mixture of two or more of them.

It is particularly effective that the butyl type rubber and the crystalline polyolefin contained in the resin composition of the present invention are mixed at a high temperature, at least before the resin composition of the present invention is used for the final application. The high temperature in this mixing is a temperature which is at least the crystal fusion point of the crystalline polyolefin. This mixing temperature is required to be less than the decomposition point of the butyl type rubber and is preferably at most about 300° C. which is the decomposition point of the butyl type rubber. The temperature is particularly preferably at most 200° C.

from the viewpoint of the productivity, etc. Accordingly, the crystal fusion point of the crystalline polyolefin is also preferably at most 200° C.

The resin composition for building material should preferably undergo hardness change as little as possible within its practically useful temperature range. To satisfy such a requirement, the crystalline polyolefin is preferably one having a crystal fusion point higher than a usual practical upper limit temperature. The usual practical upper limit temperature for the resin composition for building material is about 80° C.

In the present invention, the crystalline polyolefin is restrained by cohesive force of the crystalline phase, whereby even in a temperature range exceeding the glass transition temperature, no abrupt decrease in hardness or no fluidized state will be observed at a temperature lower than the crystal fusion point, which is observable with a non-crystalline resin. On the contrary, a remarkable decrease in the melt viscosity will be observed at the crystal fusion point as the boundary, whereby an effect for improving the kneading efficiency with the butyl type rubber can be expected.

To such a resin composition, a drying agent and the above-mentioned additives which can commonly be incorporated to resin materials for building material, can be incorporated. Especially when this resin composition is used for a spacer, it is preferred to incorporate a drying agent such as zeolite, silica gel or alumina, a tackifier, a plasticizer, a silane coupling agent and various stabilizers.

It is particularly preferred to incorporate a drying agent such as zeolite in an amount of from 5 to 30 wt % to the resin composition. Further, to impart the tackifying effects and plasticizing effects, it is preferred to add polyisobutylene in an amount of at least 200 parts by weight, particularly from 5 to 150 parts by weight, per 100 parts by weight of the butyl type rubber other than polyisobutylene.

In summary, in the present invention, particularly preferred blending proportions of components of the resin composition for spacer are from 30 to 55 wt % of the butyl type rubber, from 1 to 8 wt % of the crystalline polyolefin, from 15 to 30 wt % of the inorganic filler, and from 20 to 40 wt % of the drying agent and additives (of course, here, the proportion of the butyl type rubber is from 50 to 98 wt %, and the proportion of the crystalline polyolefin is from 2 to 50 wt %, based on the total amount of the butyl type rubber and the crystalline polyolefin).

As mentioned above, the resin composition of the present invention is preferably prepared by mixing at least the butyl type rubber and the crystalline polyolefin at a temperature higher than the crystal fusion point of the crystalline polyolefin and lower than the decomposition point of the butyl type rubber. This mixing temperature is preferably from 100 to 280° C., particularly from 120 to 250° C. Other blend components or additives may be mixed simultaneously or may be mixed before or after the mixing.

The composition of the present invention is substantially a thermoplastic composition and can be mixed by a usual mixer such as a melt mixing extruder or a kneader. Further, molding can be carried out continuously after the above mixing operation. Otherwise, the composition is prepared and then formed into a molding material of a pellet form or the like, which is then subjected to molding. As the molding method, a melt molding method such an extrusion molding method or an injection molding method can be used.

When this resin composition is used for a spacer, the molding operation may be followed continuously by preparation of an insulating glass by placing the molded product along the edge of an insulating glass material comprising two or more glass sheets arranged to face one another. Here, by using a high temperature composition discharged from the molding machine, a high level of adhesion to glass sheets can be attained. Further, by means of an apparatus such as an applicator, the molded product can be applied to the insulating glass material while controlling the temperature drop of the composition. As such an apparatus, one capable of heating is preferred.

The above-described resin composition for building material is not limited to a composition for forming a spacer for an insulating glass having the structure shown in FIG. 1. For example, the resin composition for building material of the present invention can be used as a material for a sealing material, in an insulating glass of a structure wherein the edge is sealed by a combination of a sealing material and a spacer made of a material harder than this resin for building material (such as a spacer made of a metal or a hard synthetic resin). Further, the resin composition for building material of the present invention can be used also as a resin material for use as a building material other than an insulating glass.

On the other hand, as mentioned above, the resin composition for building material of the present invention is particularly superior as a resin composition for a resin spacer which is useful for an insulating glass of a structure in which glass sheets are held as spaced by the hardness of the resin material. And, by adjusting the blending amount of the crystalline polyolefin or the inorganic filler to obtain a resin material having a suitable hardness, it is possible to realize a resin spacer for an insulating glass which has a JIS A hardness (HsA) of from 10 to 90 at 25° C.

The spacer material in the present invention is not particularly limited to the above-mentioned blending components and proportions. However, within the above blending proportions, it is possible to obtain a resin composition having a JIS A hardness and moisture permeation constant preferred in the present invention.

The glass sheets to be used for the construction of the insulating glass of the present invention may, for example, be glass sheets for windows or doors, reinforced glass, laminated glass, metal wire glass and heat absorbing glass, which are usually widely used for vehicles or as building materials, as well as glass sheets having a thin coating of a metal or other inorganic substance applied on their surface, such as heat reflecting glass or low reflectance glass, acrylic resin sheets so-called organic glass, or polycarbonate sheets, and they are not particularly limited.

Further, the insulating glass may be composed of two glass sheets or may be composed of three or more glass sheets.

Figure 2:
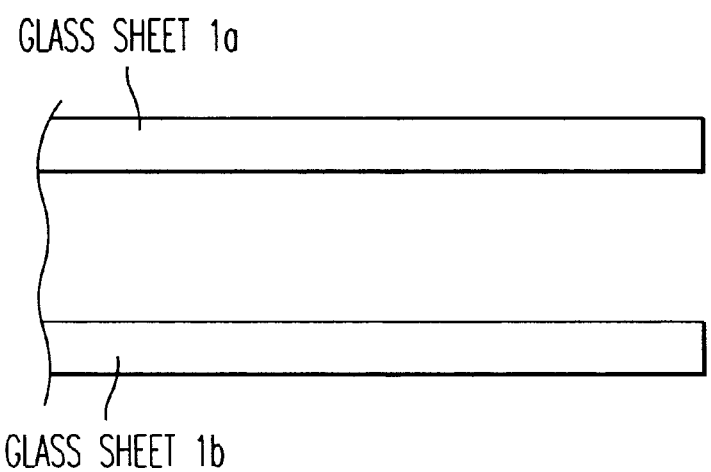
FIG. 2 is a schematic partial cross-sectional view showing the structure of an insulating glass prior to double glazing by means of a spacer made of a thermoplastic resin composition.
Figure 3:
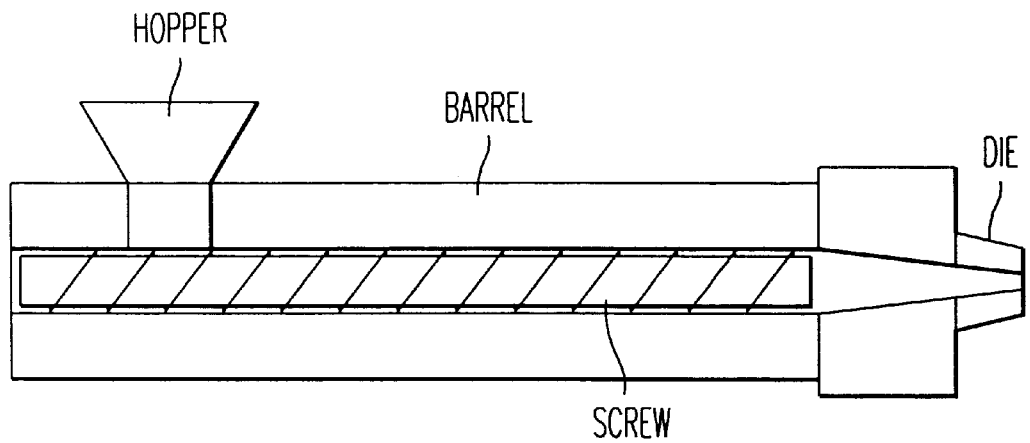
FIG. 3 is a schematic view of an extruder used for melting a thermoplastic resin composition in the present invention.
Figure 4:
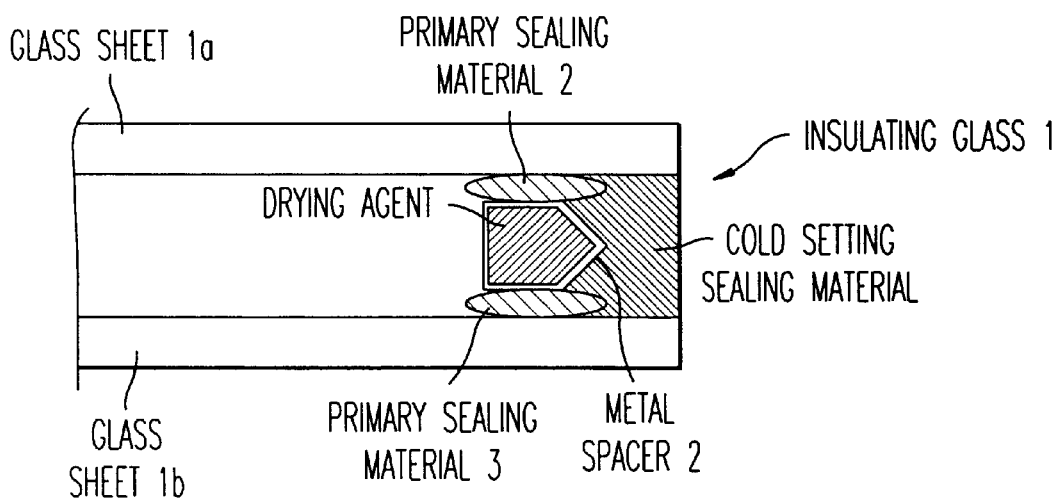
FIG. 4 is a cross-sectional view showing an example of the structure of a conventional insulating glass.
Figure 5:
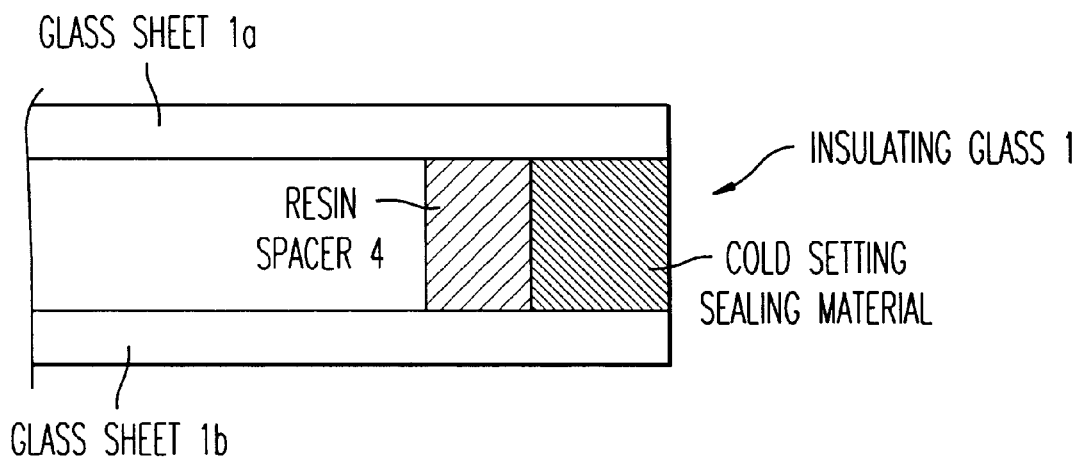
FIG. 5 is a cross-sectional view showing an example of the structure of a conventional insulating glass.

For the insulating glass of the present invention, an adhesive dissolved in a solvent may be coated to the glass surface against which the spacer abuts, as the case requires. And after drying the adhesive in air, two glass sheets 1a and 1b are held in a predetermined distance (for example 6 mm or 12 mm) as shown in FIG. 2. Then, using a common extruder having a cylinder of a suitable diameter as shown in FIG. 3, the above resin composition is melted, for example, at a temperature of from 150 to 200° C. and extruded from a die having a suitable forward end shape to interpose the composition between the two glass sheets, followed by cooling to form a spacer.

This double glazing method is merely an example, and the method for producing the insulating glass of the present invention is not limited to such a method. For example, a spacer having a desired shape may preliminarily be molded from the above-mentioned resin composition, and the spacer may, for example, be heat bonded to two glass sheets to form an insulating glass.

Suitable as the above adhesive may, for example, be an adhesive (a) containing a combination of polyester polyol and polyisocyanate, or a reaction product thereof, or an adhesive (b) containing as an effective component a polymer or prepolymer obtainable by reacting a chain extender and a terminal reactive oligomer having butylene groups as repeating units.

Preferred as the adhesive (a) is an adhesive wherein a high molecular weight polyester polyol having a molecular weight of at least 10,000 prepared from at least one aliphatic dicarboxylic acid as a starting material, is the main agent, and a polyisocyanate containing at least two isocyanate groups per molecule, is a curing agent.

The polyisocyanate may, for example, be a polyisocyanate such as 2,4-tolylene diisocyanate, 2,6-tolylene diisocyanate, phenylene diisocyanate, xylene diisocyanate, 4,4'-diphenylmethane diisocyanate, naphthylene-1,5-diisocyanate or a hydrogenated compound thereof, ethylene diisocyanate, propylene diisocyanate,. tetramethylene diisocyanate, hexamethylene diisocyanate, isophorone diisocyanate, 1-methyl-2,4-diisocyanate cyclohexane, 1-methyl-2,6-diisocyanate cyclohexane, dicyclohexylmethane diisocyanate or triphenylmethane triisocyanate, as well as an adduct compound, burette compound or isocyanate nurate compound of the above polyisocyanate and trimethylol propane.

To facilitate the initial bond strength, the aromatic polyisocyanate is preferred, and to improve the compatibility with the spacer and to improve the bond strength in the present invention, an aliphatic polyisocyanate is preferred. These polyisocyanate compounds may be used alone or in combination as a mixture of two or more of them. The content of the polyisocyanate is not particularly limited, but from the viewpoint of imparting a curing property to the composition, it is preferably contained in a blend ratio of from 1 to 10 time in equivalent to hydroxyl groups of the polyester polyol.

This adhesive (a) preferably contains a silane coupling agent. In such a case, the silane coupling agent is a hydrolyzable silyl group-containing compound having at least one member of an epoxy group, an amino group and a mercapto group in its molecule, such as γ-glycidoxypropyltrimethoxysilane, di(γ-glycidoxypropyl)-dimethoxysilane, β-(3,4-epoxycyclohexyl)-ethyltrimethoxysilane, γ-aminopropyltriethoxysilane, N-β-aminoethyl-γ-aminopropyldimethoxymethylsilane, γ-(N-phenylamino)-propyltrimethoxysilane, mercaptopropyltrimethoxysilane or mercaptopropyltriethoxysilane.

The amount of such an agent is not particularly limited, but usually, from the viewpoint of economical efficiency, the amount may suitably be from 0.05 to 10 parts by weight, to the polyester polyol and polyisocyanate.

In the adhesive (b), the terminal reactive oligomer containing butylene groups as repeating units, is a compound containing a $C_4$ bivalent hydrocarbon as repeating units and having a reactive functional group such as a hydroxyl group, a carboxyl group, an amino group, a mercapto group, an epoxy group or an isocyanate group at the oligomer terminal. It is a compound which is capable of forming a high molecular weight polymer functioning as an adhesive, when reacted with a chain extender having a functional group capable of reacting with such a functional group, for cross-linking or extension of the chain.

The butylene groups as repeating units may, for example, be ethylethylene groups [—$CH_2CH(CH_2CH_3)$—], 1,2-dimethylethylene groups [—$CH(CH_3)$—$CH(CH_3)$—], 1,1-dimethylethylene groups [—$C(CH_3)_2$—$CH_2$—] or tetramethylene groups [—$(CH_2)_4$—].

The above chain extender may, for example, be a polyisocyanate containing a compound having at least three functional isocyanate groups, as at least one component, a blend product containing a silane coupling agent such as a compound having at least three-functional hydrolyzable alkoxysilyl groups, as at least one component, or a blend product containing a compound having at least three functional double bonds and a radical initiator reactive therewith. From the viewpoint of e.g. the storage stability such as pot life, the above exemplified polyisocyanate is preferred.

To such an adhesive (a) or (b), a solvent, a catalyst, a pigment, a filler, an antioxidant, a thermal stabilizer or an aging-preventive agent, may be further added as the case requires.

Now, the present invention will be described in further detail with reference to Examples and Comparative Examples. However, the present invention is by no means restricted to such Examples.

Examples of the Resin Composition for Building Material (1)

Firstly, Examples will be given which relates to a resin composition for building material comprising a butyl type rubber and a crystalline polyolefin, wherein the proportion of the butyl type rubber is from 50 to 98 wt % and the proportion of the crystalline polyolefin is from 2 to 50 wt %, based on the total amount of the two and a resin composition for building material comprising a butyl type rubber, a crystalline polyolefin and an inorganic filler, wherein the proportion of the butyl type rubber is from 50 to 98 wt % and the proportion of the crystalline polyolefin is from 2 to 50 wt %, based on the total amount of the butyl type rubber and the crystalline polyolefin, and the proportion of the inorganic filler is at most 200 parts by weight, per 100 parts by weight of the sum of the butyl type rubber and the crystalline polyolefin.

The following Composition Examples 1 to 7 represent Examples of the present invention, and Composition Examples 8 to 12 are Comparative Examples.

Composition Example 1

As the butyl type rubber, butyl rubber having a Mooney viscosity of 47 ML(1+8) 100° C. was used, and as the crystalline polyolefin, a high density polyethylene (HDPE) having a melt index of 20, a crystal fusion point of 130° C. and a crystallinity of about 80%, was used.

The butyl rubber and HDPE were melt-mixed at 160° C. at 20 rpm for 30 minutes by a laboplastomill. The hardness (HsA) was measured in accordance with JIS K6301. The melt viscosity was measured by a capilograph at 160° C. and represented by a value at a shear rate of 91 $sec^{-1}$. With respect to the moisture permeation constant, a moisture pressure of about 20 mmHg was exerted to one side of a thin film at 60° C., and the other side was evacuated, whereby the moisture permeation constant was obtained from the rate of moisture permeated through the thin film. With respect to the tackiness at 160° C. (high temperature tack), a case where adequate tack was obtained, was identified by ◯, a case where the tack was inadequate, was identified by x, and a case where the tack was inbetween, was identified by Δ.

Using the above materials and methods, a composition comprising 70 wt % of the butyl rubber and 30 wt % of HDPE was evaluated. The results are shown in Table 1. In Tables 1, 2 and 3, the numerical values for the composition of the material are represented by wt %, the melt viscosity is represented by a unit of $10^{-4}$ poise, and the moisture permeation constant is represented by a unit of $10^{-13}$ cm³ cm/(cm²·sec·Pa).

Composition Example 2

Using the same materials and methods as in Composition Example 1, evaluation was carried out in the same manner as in Composition Example 1 with respect to a composition comprising 80 wt % of the butyl rubber and 20 wt % of the HDPE. The results are shown in Table 1.

Composition Example 3

Using the same butyl rubber and HDPE as used in Composition Example 1 and further using talc and HAF type carbon black as inorganic fillers, a test was carried out in the same method as in Composition Example 1.

Evaluation was carried out with respect to a composition comprising 47.5 wt % of the butyl rubber, 2.5 wt % of the HDPE, 30 wt % of talc and 20 wt % of carbon black, and the results are shown in Table 2.

Composition Example 4

Using the same materials as in Composition Example 3, a composition comprising 45 wt % of the butyl rubber, 5 wt % of HDPE, 30 wt % of talc and 20 wt % of carbon black, was prepared and evaluated in the same manner as in Composition Example 3, and the results are shown in Table 2.

Composition Example 5

Using a partially cross-linked butyl rubber having a Mooney viscosity of 45 ML(1+3) 121° C. as the butyl type rubber and using the same HDPE as in Composition Example 1, as the crystalline polyolefin, a composition comprising 80 wt % of the partially cross-linked butyl rubber and 20 wt % of HDPE was prepared and evaluated in the same manner as in Composition Example 1, and the results are shown in Table 3.

Composition Example 6

Using the same partially cross-linked butyl rubber and HDPE as used in Composition Example 5 and a polyisobutylene having a molecular weight of 12,000, a composition comprising 67.5 wt % of the partially cross-linked butyl rubber, 22.5 wt % of HDPE and 10 wt % of the polyisobutylene having a viscosity average molecular weight of 12,000 (hereinafter referred to as PIB-A), was prepared and evaluated in the same manner as in Composition Example 1, and the results are shown in Table 3.

Composition Example 7

A composition comprising 67.5 wt % of a polyisobutylene having a viscosity average molecular weight of 72,000 (hereinafter referred to as PIB-B) as the butyl type rubber, 10 wt % of PIB-A and 22.5 wt % of the same HDPE as used in Composition Example 1, was prepared and evaluated in the same manner as in Composition Example 1, and the results are shown in Table 4.

Composition Example 8

The same EDPE as used in Composition Example 1 was by itself evaluated in the same manner as in Composition Example 1, and the results are shown in Table 1. Further, the hardness was measured by HsD only in this Example.

Composition Example 9

Using the same materials and methods as used in Composition Example 1, a composition comprising 40 wt % of the butyl rubber and 60 wt % of HDPE, was prepared and evaluated, and the results are shown in Table 1.

Composition Example 10

The same butyl rubber as used in Composition Example 1 was by itself evaluated in the same manner as in Composition Example 1, and the results are shown in Table 1.

Composition Example 11

Using the same materials as in Composition Example 3, a composition comprising 50 wt % of the butyl rubber, 30 wt % of talc and 20 wt % of carbon black, was prepared and evaluated in the same manner as in Composition Example 3, and the results are shown in Table 2.

Composition Example 12

Using the same materials as in Composition Example 3, a composition comprising 45 wt % of the butyl rubber, 35 wt % of talc and 20 wt % of carbon black, was prepared and evaluated in the same manner as in Composition Example 3, and the results are shown in Table 2.

TABLE 1

|  | Butyl rubber | HDPE | Hardness | Melt viscosity | Moisture permeation constant | High temperature tack |
|---|---|---|---|---|---|---|
| Composition Example 1 | 70 | 30 | 40 | 1.61 | 35.3 | ○ |
| Composition Example 2 | 80 | 20 | 10 | 1.62 | 47.3 | ○ |
| Composition Example 8 | 0 | 100 | (68) | 0.541 | 7.5 | × |
| Composition Example 9 | 40 | 60 | 90 | 0.985 | 16.5 | × |
| Composition Example 10 | 100 | 0 | 0 | 2.52 | 158 | ○ |

TABLE 2

|  | Butyl rubber | HDPE | Talc | Carbon black | Hardness | Melt viscosity | Moisture permeation constant | High temperature tack |
|---|---|---|---|---|---|---|---|---|
| Composition Example 3 | 47.5 | 2.5 | 30 | 20 | 25 | 3.58 | 9.2 | ○ |

TABLE 2-continued

|  | Butyl rubber | HDPE | Talc | Carbon black | Hardness | Melt viscosity | Moisture permeation constant | High temperature tack |
|---|---|---|---|---|---|---|---|---|
| Composition Example 4 | 45 | 5 | 30 | 20 | 45 | 3.16 | 3.8 | ○ |
| Composition Example 11 | 50 | 0 | 30 | 20 | 0 | 3.85 | 23.3 | ○ |
| Composition Example 12 | 45 | 0 | 35 | 20 | 0 | 4.02 | 21.8 | ○ |

TABLE 3

|  | Partially crosslinked butyl rubber | HDPE | Polyiso-butylene | Hardness | Melt viscosity | Moisture permeation constant | High temperature tack |
|---|---|---|---|---|---|---|---|
| Composition Example 5 | 80 | 20 | — | 28 | 4.08 | 54.0 | ○ |
| Composition Example 6 | 67.5 | 22.5 | 10 | 42 | 2.87 | 43.5 | ○ |

TABLE 4

|  | PIB-A | PIB-B | HDPE | Hardness | Melt viscosity | Moisture permeation constant | High temperature tack |
|---|---|---|---|---|---|---|---|
| Composition Example 7 | 10 | 67.5 | 22.5 | 55 | 2.65 | 43.5 | ○ |

As shown in Table 1, by adding polyethylene, it was possible to increase the hardness without impairing the moisture permeability and tackiness which are the characteristics of the butyl rubber. Further, as shown in Table 2, by adding an inorganic filler, high hardness was realized simply by adding a small amount of polyethylene. Further, as shown in Tables 3 and 4, a partially cross-linked butyl rubber can be used instead of the butyl rubber, and polyisobutylene may be incorporated.

Examples of the Resin Composition for Building Material (2)

Composition Example 13

With the composition shown in Table 5, components other than the drying agent, were kneaded to obtain a resin composition having a JIS A hardness of 65, and then the drying agent composed of 4A type dry zeolite powder was added thereto, and the mixture was further kneaded-to uniformly disperse the drying agent to obtain a resin composition for spacer having a JIS A hardness of 85.

Composition Example 14 to 30

In the same manner as in Composition Example 13, with the formulation as shown in Table 5, a resin composition for spacer having a JIS A hardness as shown in Table 6 after mixing the zeolite, was obtained.

Examples of the Insulating Glass

Now, Examples in which insulating glasses were prepared by using the resin compositions for spacers of the above Composition Examples 13 to 30 will be given. The following Examples 1 to 13 are Examples of the present invention, and Examples 14 to 18 are Comparative Examples.

EXAMPLE 1

Two float glass sheets having a size of 320×500 mm and a thickness of 3 mm or 5 mm with spacer abutting portions preliminarily treated with a primer, were held with a space of 6 mm or 12 mm therebetween, and by means of a rubber extruder having a cylinder with a diameter of 40 mm, the resin composition for spacer of Composition Example 13 was extrusion molded to form a spacer along the periphery of the glass sheets, to obtain an insulating glass of the present invention.

EXAMPLES 2 to 18

In the same procedure as in Example 1, using the resin compositions for spacers of Composition Examples 14 to 30, insulating glasses were prepared in the same manner as in Example 1.

Evaluation Methods

Sheet-shifting resistance test: A glass sheet on one side of each insulating glass thus obtained was fixed, and a load of 13 kg was exerted to the other glass sheet, whereby the lowering amount of the glass sheet on the loaded side was measured at a temperature of 25° C. The one with a shifting amount being not more than 0.5 mm in 20 minutes was rated as "pass".

Accelerated durability test: In accordance with JIS R3209, the test was carried out on the insulating glass having a spacer with a thickness of 6 mm.

Dew point measurement: The measurement was carried out in accordance with the method and the apparatus described in JIS R3209. The results of the measurements are shown in Table 6.

In the Table,
Evaluation item
 A: Initial dew point (highest dew point among six samples)
 B: Dew point (° C.) upon completion of class 1 of JIS R3209 accelerated durability test
 C: Dew point (° C.) upon completion of class 2 of JIS R3209 accelerated durability test
 D: Dew point (°C.) upon completion of class 3 of JIS R3209 accelerated durability test
 E: JIS class 3 judgement
 F: Glass breakage of the insulating glass with a thickness (5 mm/6 mm/5 mm: glass sheet/air space layer/glass sheet) during the durability test (out of 100 samples)
 G: Glass breakage of the insulating glass with a thickness (3 mm/6 mm/3 mm: glass sheet/air space layer/glass sheet) during the durability test (out of 100 samples)
 H: Sheet shifting Evaluation results a: Dew point was lower than 60° C.
 b: Glass breakage occurred, since the spacer was hard
 c: Sheet-shifting was observed with an air space layer thickness of 12 mm, and no sheet-shifting was observed with 6 mm.

TABLE 5

|  | Butyl type rubber | | | | Inorganic filler | | | | |
|  | Butyl rubber | Partially crosslinked butyl rubber | PIB-A | PIB-B | HDPE | Talc | Carbon black | Additives Tackifier | Zeolite |
|---|---|---|---|---|---|---|---|---|---|
| Composition Example 13 |  | 28.7 |  |  | 28.7 | 10.6 | 10.6 |  | 21.4 |
| Composition Example 14 |  | 35.2 | 5.3 |  | 11.7 | 10.6 | 10.6 | 5.3 | 21.3 |
| Composition Example 15 |  |  | 25.6 | 17.0 | 4.2 | 10.6 | 10.6 | 10.6 | 21.4 |
| Composition Example 16 | 29.8 |  | 4.3 |  | 12.8 | 10.6 | 10.6 | 10.6 | 21.4 |
| Composition Example 17 |  | 19.1 | 25.6 |  | 2.1 | 10.6 | 10.6 | 10.6 | 21.4 |
| Composition Example 18 |  | 17.0 | 25.6 |  | 4.2 | 10.6 | 10.6 | 10.6 | 21.4 |
| Composition Example 19 |  |  | 21.3 | 21.3 | 4.2 | 10.6 | 10.6 | 10.6 | 21.4 |
| Composition Example 20 | 42.6 |  |  |  | 4.2 | 10.6 | 10.6 | 10.6 | 21.4 |
| Composition Example 21 |  | 14.8 | 25.6 |  | 6.4 | 10.6 | 10.6 | 10.6 | 21.4 |
| Composition Example 22 | 15.6 |  | 15.6 |  | 15.8 | 10.6 | 10.6 | 10.6 | 21.4 |
| Composition Example 23 |  | 21.3 | 4.2 |  | 21.3 | 10.6 | 10.6 | 10.6 | 21.4 |
| Composition Example 24 | 45.9 |  |  |  | 0.9 | 10.6 | 10.6 | 10.6 | 21.4 |
| Composition Example 25 |  | 46.8 |  |  |  | 10.6 | 10.6 | 10.6 | 21.4 |
| Composition Example 26 |  | 11.5 |  |  | 46.0 | 10.6 | 10.6 |  | 21.3 |
| Composition Example 27 |  | 5.6 |  |  | 51.9 | 10.6 | 10.6 |  | 21.3 |
| Composition Example 28 |  | 21.3 | 25.6 |  |  | 10.6 | 10.6 | 10.6 | 21.4 |
| Composition Example 29 |  | 8.5 | 4.2 |  | 34.0 | 10.6 | 10.6 | 10.6 | 21.3 |
| Composition Example 30 | 12.5 |  | 15.6 |  | 18.7 | 10.6 | 10.6 | 10.6 | 21.4 |

TABLE 6

|  | Spacer physical properties | | Evaluation items for insulating glasses | | | | | | | |
|  | Hardness | J | A | B | C | D | E | F | G | H |
|---|---|---|---|---|---|---|---|---|---|---|
| Example 1 | 85 | — | a | a | a | a | Pass | 0 | 0 | Nil |
| Example 2 | 80 | — | a | a | a | a | Pass | 0 | 0 | Nil |
| Example 3 | 65 | — | a | a | a | a | Pass | 0 | 0 | Nil |

TABLE 6-continued

| | Spacer physical properties | | Evaluation items for insulating glasses | | | | | | | |
|---|---|---|---|---|---|---|---|---|---|---|
| | Hardness | J | A | B | C | D | E | F | G | H |
| Example 4 | 75 | — | a | a | a | a | Pass | 0 | 0 | Nil |
| Example 5 | 40 | $1 \times 10^{-6}$ | a | a | a | a | Pass | 0 | 0 | Nil |
| Example 6 | 60 | $5 \times 10^{-7}$ | a | a | a | a | Pass | 0 | 0 | Nil |
| Example 7 | 65 | $1 \times 10^{-7}$ | a | a | a | a | Pass | 0 | 0 | Nil |
| Example 8 | 65 | $1 \times 10^{-7}$ | a | a | a | a | Pass | 0 | 0 | Nil |
| Example 9 | 70 | $2 \times 10^{-8}$ | a | a | a | a | Pass | 0 | 0 | Nil |
| Example 10 | 90 | — | a | a | a | a | Pass | 0 | 0 | Nil |
| Example 11 | 90 | $1 \times 10^{-9}$ | a | −55 | −54 | −40 | Pass | 0 | 4 | Nil |
| Example 12 | 20 | — | a | a | a | a | Pass | 0 | 0 | c |
| Example 13 | 10 | $1 \times 10^{-5}$ | a | a | a | a | Pass | 0 | 0 | c |
| Example 14 | 95 | — | a | a | a | Stopped | b | 0 | 4 | Nil |
| Example 15 | 95 | — | a | a | a | Stopped | b | 11 | 19 | Nil |
| Example 16 | 0 | $5 \times 10^{-4}$ | a | a | a | a | Pass | 0 | 0 | Observed |
| Example 17 | 95 | $1 \times 10^{-10}$ | −60 | 10 | Stopped | Stopped | b | 9 | 14 | Nil |
| Example 18 | 92 | $1 \times 10^{-10}$ | −60 | 5 | Stopped | Stopped | b | 9 | 1i | Nil |

From the results of Table 6, it is evident that by adjusting the hardness of the spacer to a level of from 10 to 90, it is possible to reduce glass breakage of the insulating glass and at the same time it is possible to prevent the sheet-shifting or the like. In such a case, it is possible to obtain an insulating glass having the shape of the insulating glass maintained without increase of the dew point with a spacer made solely of the above resin composition.

On the other hand, with insulating glasses of Examples 10 and 11, certain glass breakage is observed in a case where glass sheets having a thickness of 3 mm was used, although no glass breakage is observed in a case where glass sheets having a thickness of 6 mm were used. Further, with the insulating glasses of Examples 12 and 13, sheet-shifting is sometimes observed in a case where the thickness of the air space layer was 12 mm, although no sheet-shifting is observed in the case where the thickness of the air space layer was 6 mm.

From this, it is evident that as the hardness of the resin composition for spacer, EsA of from 40 to 75 is particularly preferred. Further, it is evident that as the value for the creep compliance J of the resin composition for spacer, from $1 \times 10^{-10}$ to $1 \times 10^{-5}$ is preferred, and from $1 \times 10^{-9}$ to $1 \times 10^{-6}$ is particularly preferred.

In the resin composition for spacer used for the insulating glass of Example 10, the proportion of the butyl type rubber was 98.08 wt % and the proportion of the crystalline polyolefin was 1.92 wt %, based on the total amount of the butyl type rubber and the crystalline polyolefin. On the other hand, with the insulating glass of Example 10, certain sheet-shifting may sometimes result depending upon the thickness of the air space layer. This indicates that the proportion of the butyl type rubber being from 50 to 98 wt % and the proportion of the crystalline polyolefin being from 2 to 50 wt %, based on the total amount of the butyl type rubber and the crystalline polyolefin, substantially includes the blend proportions of the above Composition Example 22, but the blend proportions as in Composition Examples 13 to 21 and 23 are preferred.

The resin composition for spacer used for the insulating glass of Example 18 is included in the compositional range of the resin composition for building material of the present invention. From this, it is evident that the resin composition in Example 18 (Composition Example 30) is the one which is not suitable for use as a spacer, among resin composition for building material of the present invention.

The resin composition for building material in the present invention is useful not only for the above-mentioned spacer but also for a sealing material for building material. Thus, the resin composition of Composition Example 30 is suitable as a low moisture permeable sealing material to seal the exterior wall material which is not as brittle as a glass sheet.

INDUSTRIAL APPLICABILITY

According to the present invention, an operation for filling a secondary sealing material can be reduced, no curing time is required, the number of process steps for preparing an insulating glass can be substantially reduced, and the insulating glass can be presented at high productivity and low costs.

What is claimed is:

1. An insulating glass comprising two or more glass sheets and a spacer, wherein
    solel the spacer separates the two or more glass sheets so as to form an air space layer between adjacent glass sheets;
    the spacer consists of a thermoplastic resin composition having a JIS A hardness of from 10 to 90 at 25° C.;
    the thermoplastic resin composition comprises butyl rubber, a crystalline polyolefin having a crystallinity of at least 50%, and inorganic fillers;
    an amount of the butyl rubber in the thermoplastic resin composition ranges from 50 to 98 wt % based on a total amount of the butyl rubber and the crystalline polyolefin in the thermoplastic resin composition; and
    an amount of the inorganic fillers in the thermoplastic resin composition ranges from 10 to 200 wt % based on the total amount of the butyl rubber and the crystalline polyolefm in the thermoplastic resin composition, wherein solely the spacer means that no other secondary sealing material or metal spacer is required. and primer treatment which may be applied as the case requires, is included.

2. The insulating glass according to claim 1, wherein the thermoplastic resin composition has a creep compliance J of from $1 \times 10^{-10}$ (cm$^2$/dyne) to $1 \times 10^{-5}$ (cm$^2$/dyne) as measured after 5 minutes from initiation of a measurement in a shear deformation mode at 40° C.

3. The insulating glass according to claim 1, wherein said thermoplastic resin composition comprises at least two types of thermoplastic resins, one of which is a hot-melt moldable rubber or elastomer, and a drying agent.

4. The insulating glass according to claim 1, wherein said thermoplastic resin composition comprises the following components:

| | |
|---|---|
| Hot-melt moldable rubber or elastomer | 10 to 80 wt % |
| Thermoplastic resin other than said rubber or elastomer | 0 to 50 wt % |
| Tackifier | 0 to 15 wt % |
| Drying agent and additives | 10 to 60 wt %. |

5. The insulating glass according to claim 1, wherein said thermoplastic resin composition comprises a butyl rubber and a crystalline polyolefin, wherein the proportion of the butyl rubber is from 50 to 98 wt %, and the proportion of the crystalline polyolefin is from 2 to 50 wt %, based on the total amount of the two.

6. The insulating glass according to claim 1, wherein said thermoplastic resin composition comprises a butyl rubbery a crystalline polyolefin and an inorganic filler, wherein the proportion of the butyl type rubber is from 50 to 98 wt %, and the proportion of the crystalline polyolefin is from 2 to 50 wt %, based on the total amount of the butyl rubber and the crystalline polyolefin, and the proportion of the inorganic filler is at most 200 parts by weight per 100 parts by weight of the sum of the butyl rubber and the crystalline polyolefin.

7. The insulating glass according to claim 8, wherein the crystalline polyolefin is at least one polymer selected from polyethylene, polypropylene and their modified products.

8. The insulating glass according to claim 4, wherein a the moisture permeation constant of the thermoplastic resin other than said rubber or elastomer, or a moisture permeation constant of the crystalline polyolefin, is at most $3000 \times 10^{-13}$ $cm^3 \cdot cm/cm^2 \cdot sec \cdot Pa$.

9. The insulating glass according to claim 3, wherein a moisture permeation constant of said hot-melt moldable rubber or elastomer, or a moisture permeation constant of the butyl rubber, is at most $3000 \times 10^{-13}$ $cm^3 \cdot cm/cm^2 \cdot sec \cdot Pa$.

10. The insulating glass according to claim 1, wherein a moisture permeation constant of said thermoplastic resin composition is at most $5000 \times 10^{-13}$ $cm^3 \cdot cm/cm^2 \cdot sec \cdot Pa$.

11. A method of making an insulating glass, the method comprising mixing a thermoplastic composition comprising butyl rubber, a crystalline polyolefin and inorganic fillers;

molding the thermoplastic composition to form a spacer;

separating at least two glass sheets with the spacer; and forming the insulating glass of claim 1.

12. A method of using an insulating glass, the method comprising installing the insulating glass of claim 1 in a building.

* * * * *